United States Patent [19]

Hertz et al.

[11] Patent Number: 4,839,665

[45] Date of Patent: Jun. 13, 1989

[54] METHOD AND APPARATUS FOR CONTROLLING THE ELECTRICAL CHARGING OF DROPS IN AN INK JET RECORDING APPARATUS

[75] Inventors: Carl H. Hertz, Skolbänksvägen 8, S-22367 Lund, Sweden; Bo Å. Samuelsson, Lund, Sweden

[73] Assignee: Carl Hellmuth Hertz, Lund, Sweden

[21] Appl. No.: 75,139

[22] Filed: Jul. 20, 1987

[51] Int. Cl.[4] ...................... G01D 18/00; G01D 15/18

[52] U.S. Cl. ........................................ 346/1.1; 346/75

[58] Field of Search .................................. 346/1.1, 75

[56] References Cited

U.S. PATENT DOCUMENTS 3,769,630 10/1973 Hill et al. .............................. 346/75

3,769,632 10/1973 Julisburger et al. .................. 346/75

4,288,796 9/1981 Aiba et al. ............................ 346/75

*Primary Examiner*—E. A. Goldberg

*Assistant Examiner*—Gerald E. Preston

*Attorney, Agent, or Firm*—Henry C. Nields

[57] ABSTRACT

In an ink jet recording apparatus, the generation of insufficiently charged or discharged drops which may occur when a charge controlling signal (print pulse) is switched within a forbidden zone of the period of the drop formation process is avoided. The portion of the drop formation process period, during which the switching is permitted, is determined by detecting the charge carried by trains of drops which are produced by probe charge control signal of varying phase relative to the drop formation process.

12 Claims, 7 Drawing Sheets

RESISTANCE R OF THE CONTINUOUS PART OF THE JET A FUNCTION OF THE PHASE θ OF THE DROP FORMATION PROCESS FOR THREE DIFFERENT RESISTIVITIES OF THE INK.

METHOD AND APPARATUS FOR CONTROLLING THE ELECTRICAL CHARGING OF DROPS IN AN INK JET RECORDING APPARATUS

FIELD OF THE INVENTION

The present invention relates to ink jet recording, more specifically to controlling the amount of electrical charge which is applied to droplets of a disintegrated ink jet when an electrical potential is applied between the ink and a control electrode surrounding the region, where the jet disintegrates into the droplets.

BACKGROUND OF THE INVENTION

U.S. Pat. No. 3,916,421, included herein by reference thereto, describes an ink jet recording device in which an ink jet issues under high pressure from a nozzle and breaks up into a train of drops at a point of drop formation inside a control electrode. This train of normally uncharged drops travels in a line or along an initial axis towards an ink receiving surface, as a recording medium, e.g. a sheet of paper, which is mounted on or otherwise affixed to a support movable relative to the nozzle, e.g. a rotating drum of a drum plotter. On the way from the nozzle to the ink receiving surface, the drops pass a transverse electric field generated between a negatively charged high voltage electrode and a lower part of the control electrode. Now, if a positive control voltage is applied to the control electrode while the ink in the nozzle is grounded, an electric field is established at the point of drop formation causing each of the drops formed at the point of drop formation to be negatively charged. Because of the charge, these drops are deflected into a catcher or gutter and cannot reach the ink receiving surface. Thus, the length of time during which the signal voltage or "print pulse" applied to the control electrode is zero or less than a cut-off control voltage, determines the number of drops that reach an elementary area (pixel area) of the receiving surface, which is aligned with the ink jet axis. Thus, the printing pulses control the amount of the ink laid down on the individual pixel areas and therefore the densities of the pixels which in turn may form a halftone image. An improvement of the ink jet apparatus mentioned above is described in U.S. Pat. No. 4,620,196 also included herein by reference thereto. In this improved ink jet apparatus, the rate and position of the drop formation is controlled by ultrasonic stimulation of the ink jet. Further, the length of the electric print pulses determining the number of drops that reach the receiving surface is adjusted such that it equals n/f, where f is the drop formation rate which is equal to the ultrasonic stimulation frequency (e.g. 1 MHz) and n is an integer chosen such that the ratio n/f is close to the length of the original print signal. Additionally the start of the print pulse is synchronized with a suitable phase of the ultrasonic stimulation. This ensures the start of the print pulse always coinsides with the same phase of the drop formation process. The effect of these measures is an appreciable reduction of the draininess of the half tone image formed by the printed pixels.

It has further been proposed to synchronize the drop formation rate and, thus, the printing pulses, with the pixel rate which is controlled in dependence of the relative movement between the nozzle and the ink receiving surface, i.e. in the case of a drum plotter by means of a shaft encoder. This reduces the draininess of the printed image.

The electrical charge which an individual droplet receives when a given potential difference is applied between the ink jet and the control electrode depends to a great extent on the relationship between the time of formation of the droplet under consideration and the time of application of the potential difference. In the case of a stimulated jet, where the drop formation rate is controlled by an ultrasonic stimulation signal of predetermined frequency, the amount of electrical charge which is applied to the first droplet separated from the continuous portion of the jet after the occurrence of the leading edge of a printing pulse is ultimately a function of the phase angle of the stimulation signal period at which the leading edge of the print pulse occurs.

U.S. Pat. No. 4,620,196 mentioned above discloses means for synchronizing the start of the print pulse with a suitable phase of the ultrasonic stimulation. This synchronization must be adjusted by highly trained personal. Further, the synchronization established in the factory or at the beginning of a recording process to yield optimum results may become insatisfactory when parameters, such as the temperature, pressure, viscosity and composition of the ink change during the recording process. Thus, it is desirable to provide a method and an apparatus by which the relationship between the drop formation and the occurrence of the leading edge of the print pulses can be adjusted in short intervals to provide for the application of a desired amount of charge to the drop formed after the occurrence of the leading edge of a print pulse.

BRIEF DESCRIPTION OF THE INVENTION

It is therefore automatically an object of the invention, to provide a method and an apparatus securing a desired relationship between the phase of the drop formation process and the timing of the leading edge of a print pulse. Since it is not feasible with the present technology to measure the minute amount of electrical charge carried by an individual droplet, the present invention proposes to apply an electrical probe pulse between the ink and the control electrode during a period of time when no record is produced, e.g. before the beginning of the recording process, when the nozzle or nozzles are positioned beyond the margin of the ink receiving or recording surface and/or in the case of a drum plotter, during the period of time during which the ink jet is directed to a circumferential region of the drum which is not covered by the record medium. The probe pulses, which may have a greater amplitude or voltage than the normal printing pulse amplitude, are applied with continuously varying phase relationship with respect to the ultrasonic stimulation signal which controls the drop formation rate and phase. The current drawn by the ink jet at a specific relative phase is measured and the phase is maintained, when a desired, e.g. maximum current is obtained. Alternatively he droplets charged by the probe pulses are directed to a target, e.g. the edge of a drop interception member or gutter. The charged droplets form a fine mist when the hit the edge and the mist is collected by a collector electrode. A high potential difference, e.g. 2000 volts, is maintained between the edge and the collector electrode by an appropriate voltage source, and the electrical current produced by the mist between the edge member and the collector electrode is measured to obtain a signal reflecting the amount of the charge of the droplets at the present phase relationship between the leading edge of the probe pulse and the phase of the stimulation signal. By varying this phase relationship until the current attains a maximum value, the optimum phase angle at which the print pulses are to commence is found. The following recording process is effected with this phase angle.

It has further been discovered that the electrical resistivity of the ink should be as low as possible, generally below 150 Ohm cm, preferably below about 120 or 100 Ohm cm to accelerate the charging of the droplets. Inks for ink jet printing generally comprise water and/or an alcohol (e.g. about 80 vol %), a liquid of low vapor pressure, such as glycerol or glycole (e.g. about 20 vol %), a dye soluble in the liquid of low vapor pressure, and optionally small amounts of further additives as fungizides. According to a further aspect of the present invention, the resistivity of the ink is decreased by adding an ionic additive, as an alkali metal halogenide, as lithium chloride or natrium chloride.

BRIEF DESCRIPTION OF THE DRAWINGS

The present invention will become more readily apparent from the following description of preferred embodiments thereof shown and described with reference to the attached drawings in which.

DETAILED DESCRIPTION OF THE INVENTION AND OF PREFERRED EMBODIMENTS THEREOF

The methods and apparatus of this invention can be implemented in various types of ink jet apparatus, as monochrome or multi-color ink jet printers by using various electrode systems and control schemes. However, for the sake of simplicity, the invention will be described with reference to an ink jet printing apparatus comprising a single jet as described in U.S. Pat. No. 3,916,421 mentioned above.

Figure 1:
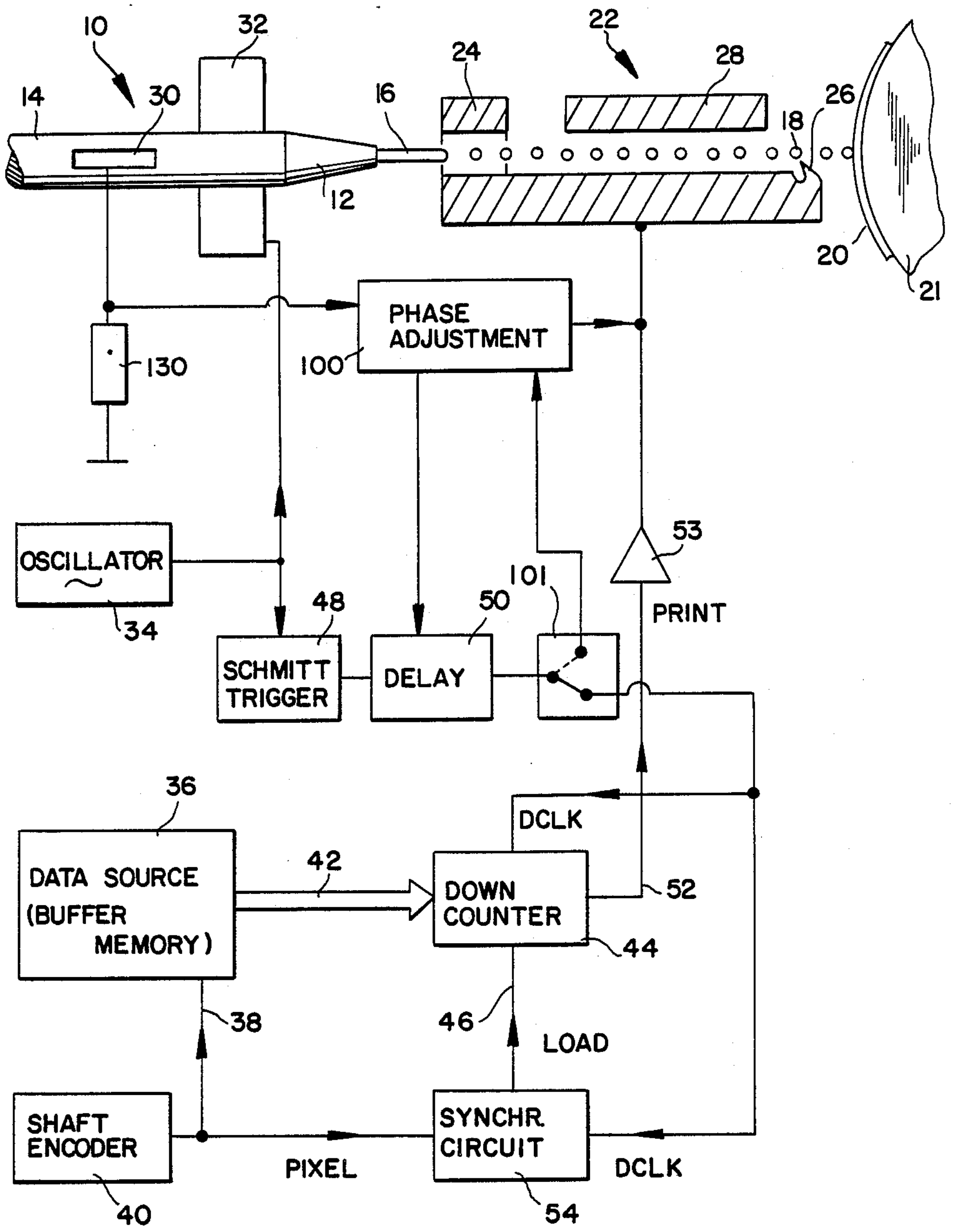
FIG. 1 shows a simplified side view of a part of an ink jet printer, partially in section, and a block diagram of an associated electrical circuitry comprising an embodiment of the invention.

Referring to FIG. 1, the ink jet printer shown comprises droplet formation means 10 including a nozzle 12 having a diameter of e.g. 10 microns and connected by an ink conduit 14 to a pressurized ink source (not shown). In operation a high speed ink jet 16 is ejected from the nozzle 16 and breaks up, at a drop formation point, into a series of fine ink drops 18 directed along an axis to a record medium 20 supported on a rotating drum 21 or any other suitable support movable relative to the nozzle 12.

An electrode system 22 is interposed between the nozzle 12 and the recording medium 20. The electrode system 22 is of known type and comprises a control electrode 24 which has a tubular portion surrounding the drop formation point, and an elongated portion extending toward the recording medium 20 and forming a knife edge 26 acting as drop intercepting means. The electrode system further comprises a high voltage deflection electrode 28 cooperating with the elongated portion of the control electrode. The ink within the ink conduit 14 is electrically coupled to ground via an electrode 30. An ultrasonic transducer 32 is coupled to the nozzle 12 for controlling the drop formation rate as high frequency (e.g. 1 MHz) signal source, as an oscillator 34. The oscillator signal is also used to generate a clock signal for the electronic circuitry which controls the printing. The information determining the ink or (component) color density in each pixel is provided by a data source 36 which in this case is assumed to be a buffer memory. The buffer memory 36 has a read command input 38 coupled to the output of a shaft encoder 40 connected to a shaft of the drum 21 which supports the recording medium 20. The shaft encoder 40 issues an index pulse for each revolution of the drum, and a pixel pulse for each pixel location aligned with the axis of the ink jet and droplet path. The data source 36 has a digital density signal output coupled to an information input of a down counter 44 and responds to each pixel pulse applied to its read command input 38 by supplying the corresponding density value to the down counter 44. The down counter 44 has a load command input 46 and stores the momentary density value received from the data source 36 when a LOAD signal is applied to input 46. The density signal determines the number of ink droplets which are to be laid down on the present pixel location. The down counter 44 is clocked down by a signal DCLK which is derived from the output signal of the oscillator 34 via a Schmitt trigger circuit 48, an adjustable delay circuit 50 and a single-pole double-throw electronic switch 101, when the switch 101 is in its normal or plotting operation state shown in full line. The down counter 44 has a printing pulse output 52 on which a printing pulse appears which commences when the first DCLK pulse is received after the loading of the density value and which ends when the counter has been clocked down to zero by the DCLK pulses. The printing pulse is applied via an inverting amplifier 53 to the control electrode 24 to reduce the jet suppression voltage of e.g. 200 volts at this electrode below the cut-off level as long as the printing pulse lasts, to allow the drops 18 to reach the record medium 20. A synchronizing circuit 54 is coupled into the signal path between the shaft encoder 40 and the load command input 46 of the down counter 44.

So far described and in other respects, with the exception of a circuit 100 for controlling the charging of the droplets which will be disclosed below, the apparatus may correspond to that described in U.S. Pat. No. 4,620,196 mentioned above, and in U.S. patent application Serial No. 157,776 based on European Patent Application No. 87,105,560 (filed Apr. 14, 1987) and incorporated herein by reference thereto.

Figure 2:
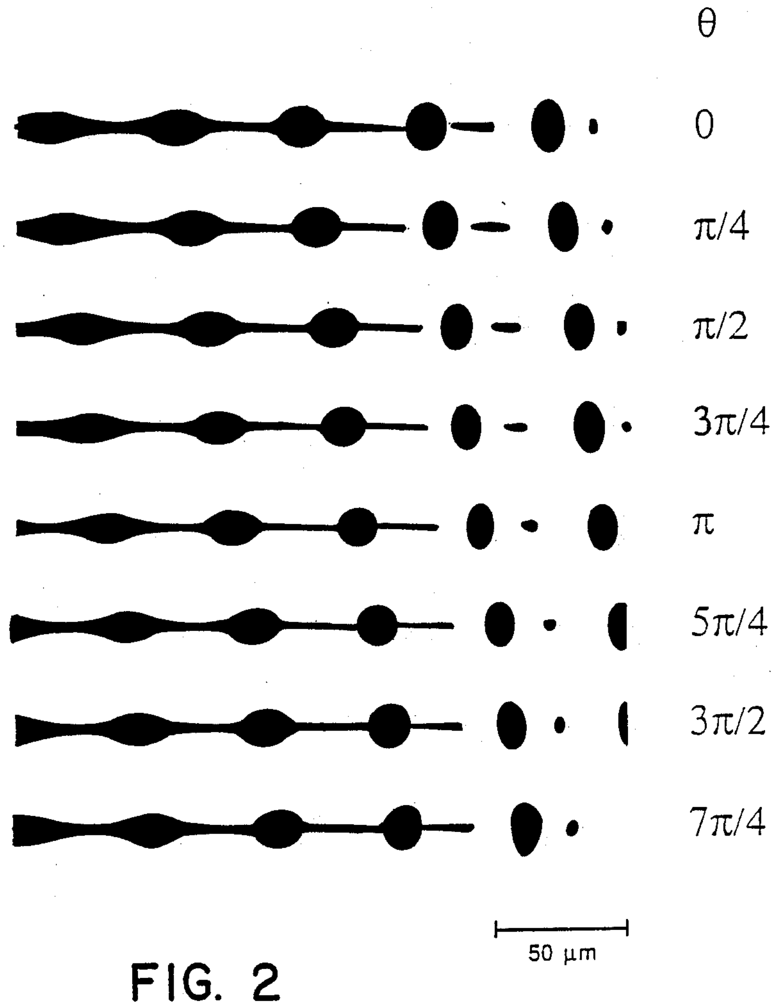
FIG. 2 enlarged views of the portion of an ink jet where it disintegrates into a train of individual drops, at times corresponding to different phases of the drop formation process.
Figure 3:
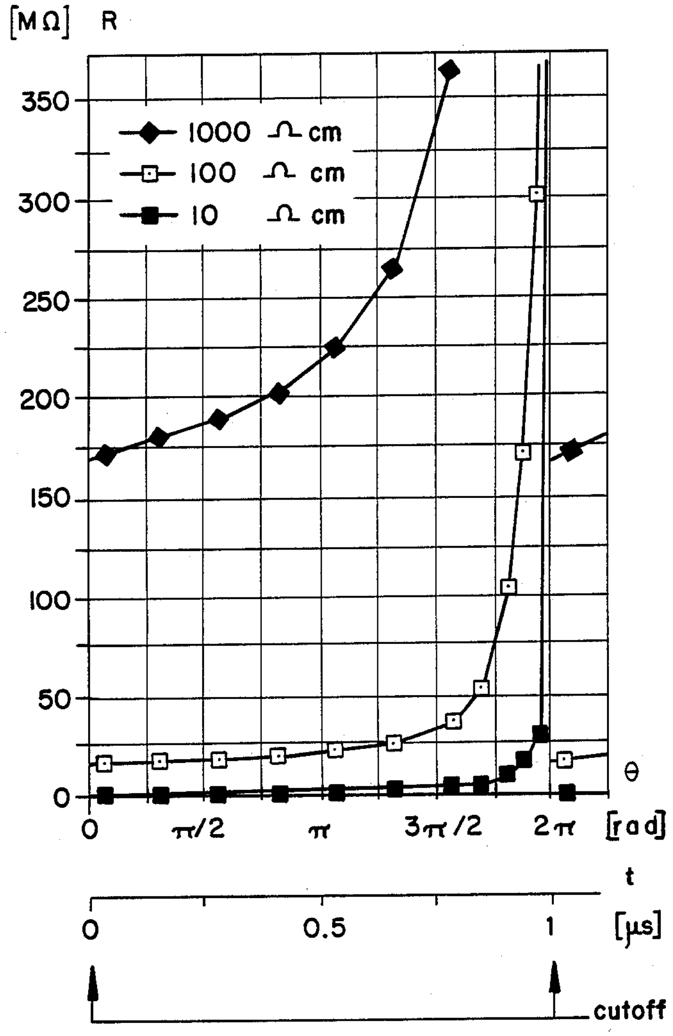
FIG. 3 a diagram of the resistance R(t) of the continuous part of the jet as a function of the phase of the drop formation process for three different resistivities of the ink.
Figure 4:
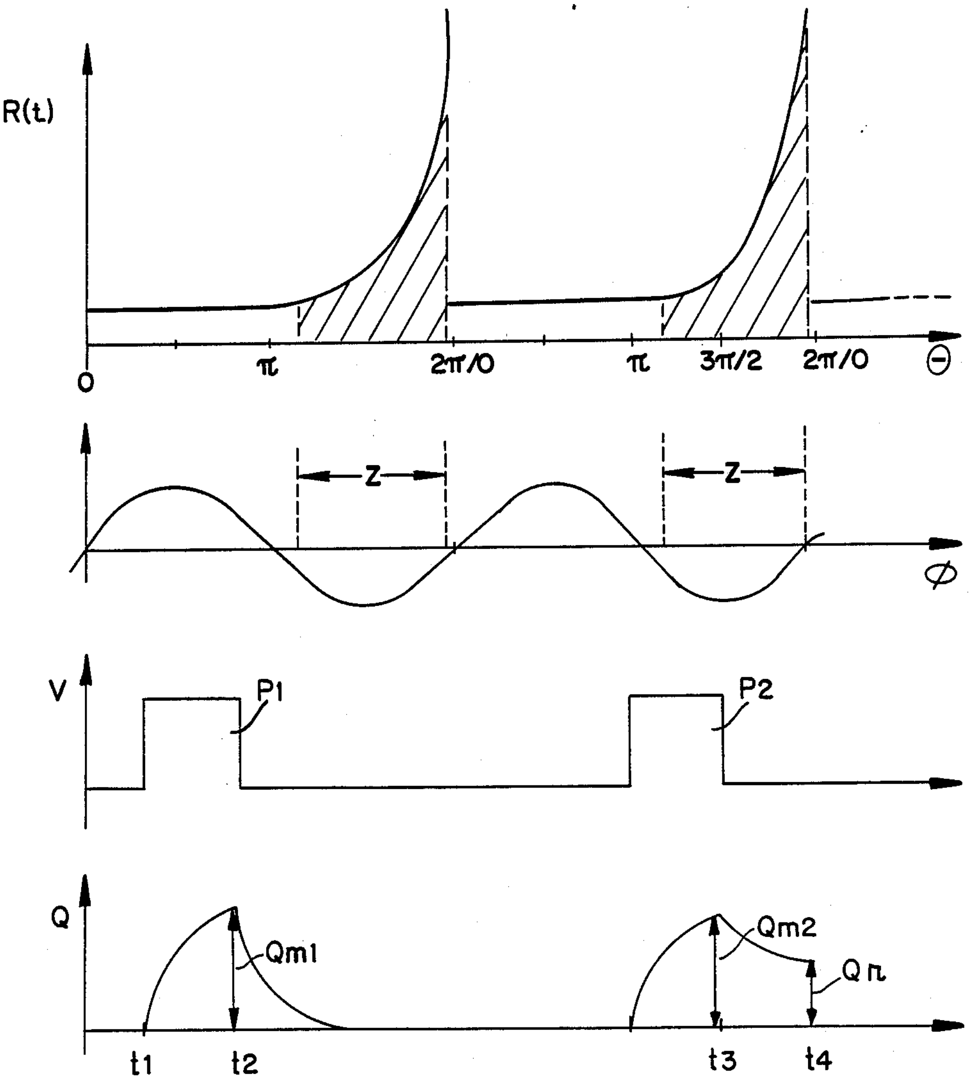
FIG. 4 shows a diagram similar to FIG. 3 and related signal waveforms.

Reference is now made to FIGS. 2, 3 and 4 for explaining the problem on which the invention is based. FIG. 2 shows enlarged photographs of the portion of an ink jet, where it disintegrates into a train of droplets, at times corresponding to eight different values of the phase angle of the stimulating signal from oscillator 34 which controls the drop formation rate. Contrary to the theory published 1878 by Ralyleigh, the exponentially growing axisymmetrical variations of the jet diameter deviate appreciably from the form of a sinosoidal wave. Actually, the jet develops roughly spherical portions which later become the individual droplets and which are separated by thin, rot shaped intermediate portions (which may become so-called satelite droplets of small size). It can be easily appreciated from FIG. 2 that current which supplies the electrical charges to the spherical portions and ultimately to the droplets, will encounter an increasing electrical resistance when the rod-like portion connecting the continuous portion of the jet with the most distal spherically enlarged portion, which will become the next droplet, becomes thinner and thinner.

FIG. 3 shows the electrical resistance R of the continuous part of a jet, ejected from a nozzle with a diameter of 10 microns, as a function of the phase $\theta$ of the drop formation process for three different resistivities of the ink. If the drop formation rate is assumed to be 1 MHz, the period of time available for charging or decharging an individual droplet is a fraction of $10^{-6}$ seconds. The capacitance of a droplet which is to be charged within this period of time is about $5 \cdot 10^{-16}$ F. The charging or decharging time constant is the product of the time-dependent resistance R(t) of the ink between the electrode 30 (FIG. 1) and the distal end of the jet which will become the next droplet, times the droplet capacitance. A simple calculation shows that, with the above assumptions, the resistance of the column of ink between the electrode 30 and the separating droplet should be well below $100 \cdot 10^6$ Ohms, preferably below $50 \cdot 10^6$ Ohms or even lower. This means that the charging or decharging process must be completed before the steep rise of the resistance, thus, in FIG. 3 before about $3\pi/2$. FIG. 3 also shows that satisfactory charging the droplet is not possible at all when the resistivity of the ink is 1000 Ohm cm (upper curve in FIG. 3). Summarizing, there is a forbidden phase angle region Z within which no switching of the print pulse signal should occur. Closer investigations show, that the forbidden region ends somewhat before the time at which the drop actually separates from the tip of the jet. It is also known that the printing pulse or signal voltage should not be strictly rectangular but have somewhat rounded edges to compensate for the so-called historic effect. However, to simplify the following explanation, the printing pulse or signal voltage will be assumed to be of rectangular shape.

If the printing pulse commences or terminates well within the forbidden region, a drop results which carries an intermediate charge which may be too small for causing the drop to be sufficiently deflected so that it will be intercepted and prevented from reaching the recording medium, but sufficient to deflect the drop off the essentially straight path to the record medium. The drop may therefore reach the record medium off the current pixel position and the recorded image will show some graininess. This applies both to the leading and the lagging edges of the printing pulse.

According to a first aspect of the present invention, the forbidden region Z is found out by means of probe pulses of varying phase relationship with respect to the stimulating signal, and measuring the droplet charging current flowing at the various phase angles, as now will be explained with reference to the diagrams of FIG. 4 which are drawn with a common time scale (x axis). The upper diagram in FIG. 4 shows the time-dependent resistance R(t) of the continuous part of the jet for a given ink resistivity as a function of the phase angle of the drop formation process according to FIG. 2. The forbidden region Z is shaded. The second diagram in FIG. 4 shows the waveform of the stimulating signal from oscillator 34 (FIG. 1). The relationship between the phase $\theta$ and the phase $\phi$ of the stimulating signal is arbitrarily chosen. The third diagram in FIG. 4 shows two probe pulses having different phase relationships with respect to and The fourth diagram shows the charge applied to the enlarged end portion of the jet which will become the next droplet. The duration of the probe pulses P1 and P2 is preferably short, e.g. one forth or less of the period 2 of the droplet formation process, but it may have any duration differing from an integer number (including one) of this period.

The probe pulse P1 starts and ends within the allowed region. During the application of the pulse voltage between the ink electrode 30 and the control electrode 24 (FIG. 1) the enlarged end portion of the jet which will become the next droplet charges to some maximum charge $Q_{m1}$ as shown in the portion of the forth diagram of FIG. 4 between times t1 and t2. Since the resistance of the charging current path is relatively low, $Q_{m1}$ will have a relatively large value. In the period of time following t2, the probe pulse voltage V is zero and the charge on the droplet portion will therefore dissipate through the ink column with about the same discharge time constant as during the charging since the resistance of the ink column is still low. Thus, the net charge of the droplet which will eventually separate from the ink column will be essentially zero.

Figure 5:
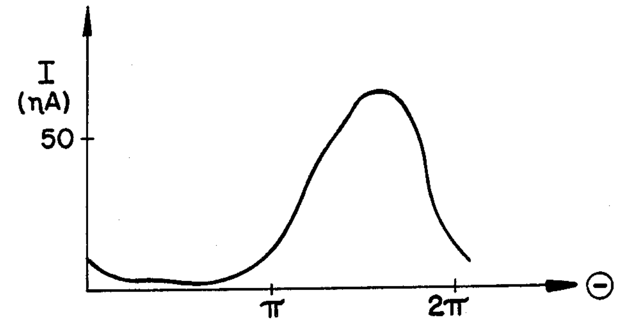
FIG. 5 is a diagram of the magnitude of an electrical current I generated by probe pulses as a function of the phase relationship between the probe pulses and the drop formation process.

The probe pulse P2 commences at time $t_3$ which is still in the allowed region. However, during the duration of the probe pulse P2, the resistance R(t) begins to rise. Thus, at the end of the probe pulse P2 at time t4, the end portion of the jet which will become the next droplet, has received a charge $Q_{m2}$ which is somewhat less than $Q_{m1}$. More important, the resistance of the ink column increases sharply after t4 so that a much longer discharging time constant will be effective. Thus, at the end of the period, some finite residual charge $Q_r$ will remain on the separated droplet. Thus the situation explained with reference to probe pulse P1 will result in a value of the net charging current which is zero or close to zero while the situation explained with reference to probe pulse P2 will produce some non-zero net charging current which can be measured and used as an indication that the forbidden region Z had been encountered by the probe pulse. If the probe pulse is positioned in phase as the pulse P2 in FIG. 4 the drops are negatively charged as each drop cannot be discharged completely at the end of the probe pulse P2 since its trailing edge lies in the forbidden region Z. As the result of this a current I flows to ground from the electrode 30 in the ink conduit 14 through the resistor 130. This current is equal to $N \cdot Q_m$, where N is the number of drops generated per second and $Q_m$ the charge on each drop. The maximum of I is normally 10 to 100 nA dependend on the amplitude and width of the pulse P. However, since the residual charge $Q_m$ left on the drop after its formation depends on the phase of the probe pulse P relative to the drop formation process as described above, the current I through the resistor 130 will depend on the phase of the probe pulse. From FIG. 4 we can deduce that this current will be about zero if the probe pulse lies well outside the forbidden region Z and increases to its maximum value if the probe pulse phase is shifted into Z as indicated in FIG. 5. In this figure the current I is given as a function $\theta$ of the leading edge of the probe pulse relative to the drop formation process as shown in FIG. 2. Although this dependency changes with the shape of the probe pulse it is obvious that the position of the forbidden region Z in the drop formation phase domain can be detected from the magnitude of I.

It should be obvious that the function shown in FIG. 5 depends on the width and amplitude of the probe pulse, which can be varied within wide limits. The length of this pulse might even be longer than the period of the signal generated by the oscillator 34, but should not be an exact multiple of this period.

Figure 6:
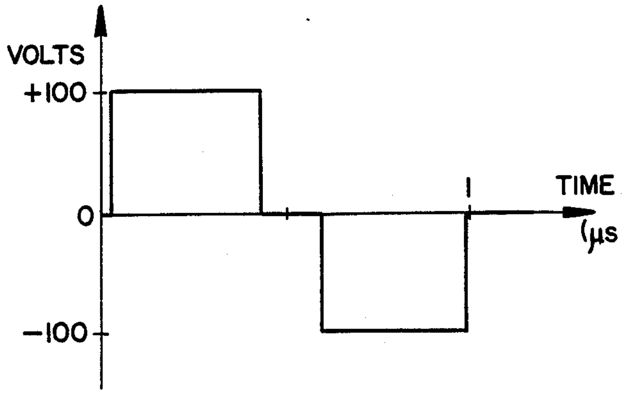
FIG. 6 shows a probe pulse of preferred waveform.
Figure 7:
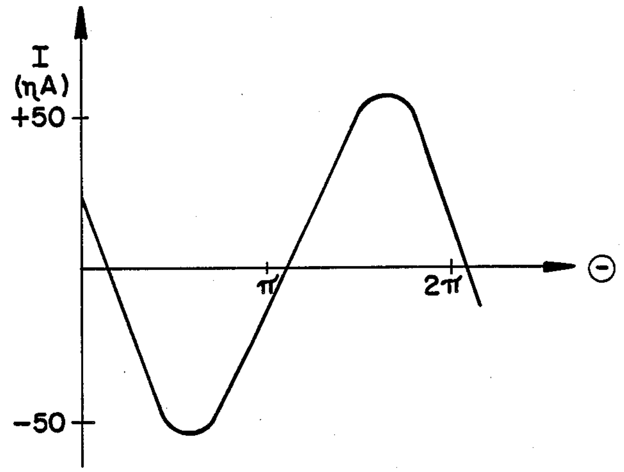
FIG. 7 shows, similar to FIG. 5, the magnitude of the current I vs. the relative phase when using the probe pulse waveform of FIG. 6.
Figure 9:
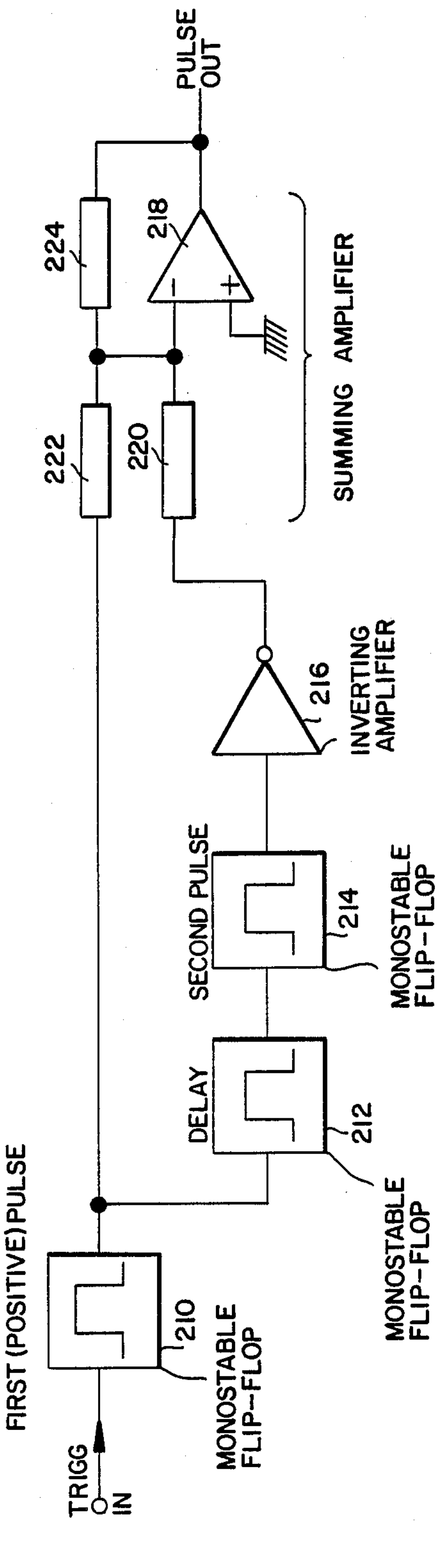
FIG. 9 is a block diagram of an exemplary circuit for producing the probe pulses shown in FIG. 6.

The probe pulse might even have quite different and complex shapes. A preferred shape of the probe pulse is shown in FIG. 6. This probe pulse consists of two spaced pulses of equal width and amplitude but opposite polarity, each pulse width being at most equal to half the signal period of the oscillator 34. If the phase of this complex probe pulse is shifted relative to the drop formation process the current I in the resistor 130 varies approximately as indicated in FIG. 7. This phase dependence shows two zero crossings which are easy to detect by electronic means. Therefore the complex probe pulse shown in FIG. 6 is preferred. Such a complex probe pulse can be generated by a special pulse generator upon receipt of a trigger pulse. An example of such a probe pulse generating circuit is shown in FIG. 9. Of course, it is not necessary that the two pulses of the complex probe pulse shown in FIG. 6 have the same width and amplitude, they may even have the same polarity and the individual pulses of opposite polarity may follow each other without spacing. Alternatively even more complex forms of probe pulses may be used. Hence the example shown in FIG. 6 is meant as a preferred embodiment only and is by no means limiting the possible probe pulse shapes.

It has been pointed out earlier that the current I flowing through the resistor 130 is relatively small, normally less than 100 nA. Therefore it is somewhat difficult to detect. This problem can be greatly facilitated by modulating the amplitude of the probe pulses by a sine wave or similar periodic signal, the frequency $f_m$ of which is constant and much lower than the drop formation frequency controlled by the oscillator 34 (e.g. 1/10 to 1/100 of said frequency). In that case the current I will contain a strong AC component of known frequency $f_m$ which can be easily amplified by a narrow-band amplifier. This method also discrimates against possible DC offset currents in the resistor 130. Obviously this probe pulse modulation method can be used also with complex probe pulses described earlier.

It has been pointed out that it is important that the print pulse is switched on and off outside the forbidden region Z, i.e. the switching should occur during those phases of the drop formation process when the resistance R(t) of the continuous part of the jet is relatively small. To achieve this it is necessary to know the phase of the forbidden region Z relative to the signal generated by the oscillator 34. Since this phase depends on the jet velocity, the amplitude of the ultrasonic vibrations at the nozzle 12 and other variable parameters, this phase has to be measured and the result of the measurement used to delay the leading edge of the print pulse by the delay circuit 50 so that this edge does not fall into the forbidden region Z. In the following it will be shown how this can be accomplished.

Experience has shown that the jet parameters remain fairly constant during one plotting operation. Therefore it is sufficient to adjust the print pulse phase immediately before starting the plotting of a picture on a drum plotter. This can be achieved by an electronic adjustment circuit 100 shown in block form in FIG. 1 and in detail in FIG. 8. In this circuit 100 the magnitude of the current I flowing from the ink conduit electrode 30 through the resistor 130 to ground is sensed by an amplifier 131 which amplifies the voltage drop produced by this current across the resistor 130. The amplifier output is then applied to a comparator or zero crossing detector 132. Whenever the input voltage to the comparator crosses a predetermined discriminator voltage set by a voltage divider 133, the comparator 132 applies a pulse to a saw-tooth generator 149. This pulse immediately stops the saw-tooth generator so that its output voltage remains constant after this event. This function could also be obtained with an analog sample-and-hold circuit. The output is then applied to the voltage controlled delay circuit 50 to control its variable delay.

The circuit 100 contains further a probe pulse generator 151 which generates a probe pulse of predetermined shape each time it is triggered by a pulse signal from the electronic switch 101.

A drum plotter containing the circuitry shown in FIG. 1 is normally controlled by a microprocessor (not shown). To activate the phase adjustment circuit 100 at the start of a plotting operation the microprocessor sets the electronic switch 101 in FIG. 1 or 8 into its "upper" position to connect the output of the delay circuit 50 to a trigger input T of the probe pulse generator 151. Thus the pulses generated by the oscillator 34 and Schmitt trigger 48 (after passing the delay circuit 50) are then able to trigger the probe pulse generator 151. In this way one probe pulse is applied through the amplifier 152 to the electrode 24 for each period of the oscillator signal. The phase of these probe pulses is determined by the delay suffered by the oscillator signal when passing the delay circuit 50, which in turn is controlled by the delay control voltage applied to it from the saw-tooth generator 149.

As soon as the switch 101 is set in the upper or "phase adjustment" position the saw-tooth generator is started by the microprocessor. This generator increases its output voltage linearily to a maximum value in about 1 second. As the result of this the delay experienced by the oscillator signal in the delay circuit 50 increases accordingly which changes the phase of the probe pulse generated by the circuit 151 relative to the oscillator signal and the drop formation process. This in turn varies the current I in the resistor 130 as explained above.

When the voltage drop across the resistor 130, amplified by the amplifier 131 has reached the predetermined reference voltage set by the voltage divider 133, the comparator 132 will generate a pulse which stops the saw-tooth generator 149. The reference voltage is chosen such that this happens only when the probe pulse lies well outside the forbidden region Z. The output signal of the comparator 132 causes the microprocessor to switch the electronic switch 101 back to its "lower" or normal plotting operation state shown in FIG. 8 in full line. After this the output voltage of the saw-tooth generator and thus also the delay introduced by the delay circuit 50 is constant until the end of the plotting operation.

As the result of the delay adjustment procedure described above, the pulses generated by the oscillator 34 will lie outside the forbidden region Z after having passed the delay circuit 50. Thus when the microprocessor has thrown the switch 101 back into its normal position the plotting operation itself can commence. Then the pulses generated by the oscillator 34 and Schmitt trigger 48 will pass through the delay circuit 50 and the switch 101 to the down counter 44, where they generate the print pulses as described in the European patent application No. 87105560 filed Apr. 14, 1987. Since the oscillator signal pulses are delayed in delay 50 so that they fall well outside the forbidden region Z, the same is true for the leading edge of the print pulses which was required if a perfect image quality was to be generated during the plotting operation.

It has been mentioned above that the detection of the current I in the resistance 130 can be facilitated by modulating the probe pulse amplitude with a suitable signal with the frequency $f_m$. This feature can be easily employed in the adjustment circuitry of FIG. 8 by using an output amplifier 152 the gain of which can be controlled by an external signal voltage. This signal may be supplied by a signal generator 153 which generates e.g. a sine wave signal of frequency $f_m$. This signal modulates the probe pulse amplitude and thereby the current I with the frequency $f_m$. To detect the AC component of the current I, a narrow band amplifier followed by a rectifier or phase detector circuit, the output of which is fed into the comparator 132, or any other type of known synchroneous detector or correlation circuitry is used in the place of the input amplifier 131.

Generally the current I can be detected in various other ways. Thus, if the jet is caught by a conductive but insulated catcher (gutter) in front of the electrode system 22 and said catcher is connected to ground through a resistor similar to the resistor 130, any charge on the drops will result in a current $I_c$ from the catcher to the ground. If this current is detected by means of the input amplifier 131 of FIG. 8 the adjustment procedure can be carried out in exactly the same way as described above.

Alternatively the deflection of the flight path of the drops in the transversal deflection field between the electrodes 24 and 28 in FIG. 1 can be detected, since this deflection is a measure of the charge of the drops. Such a measurement can be achieved most easily by determining if the jet travels above or below the catcher blade 26 in FIG. 1. Alternatively an arrangement of wire targets can be used as described in the US patent application "Electronic Method and Device for Adjustment of Jet Direction in an Ink Jet Apparatus" filed July 8, 1987 in the name of Carl Hellmuth Hertz and incorporated herein by reference thereto.

Figure 8:
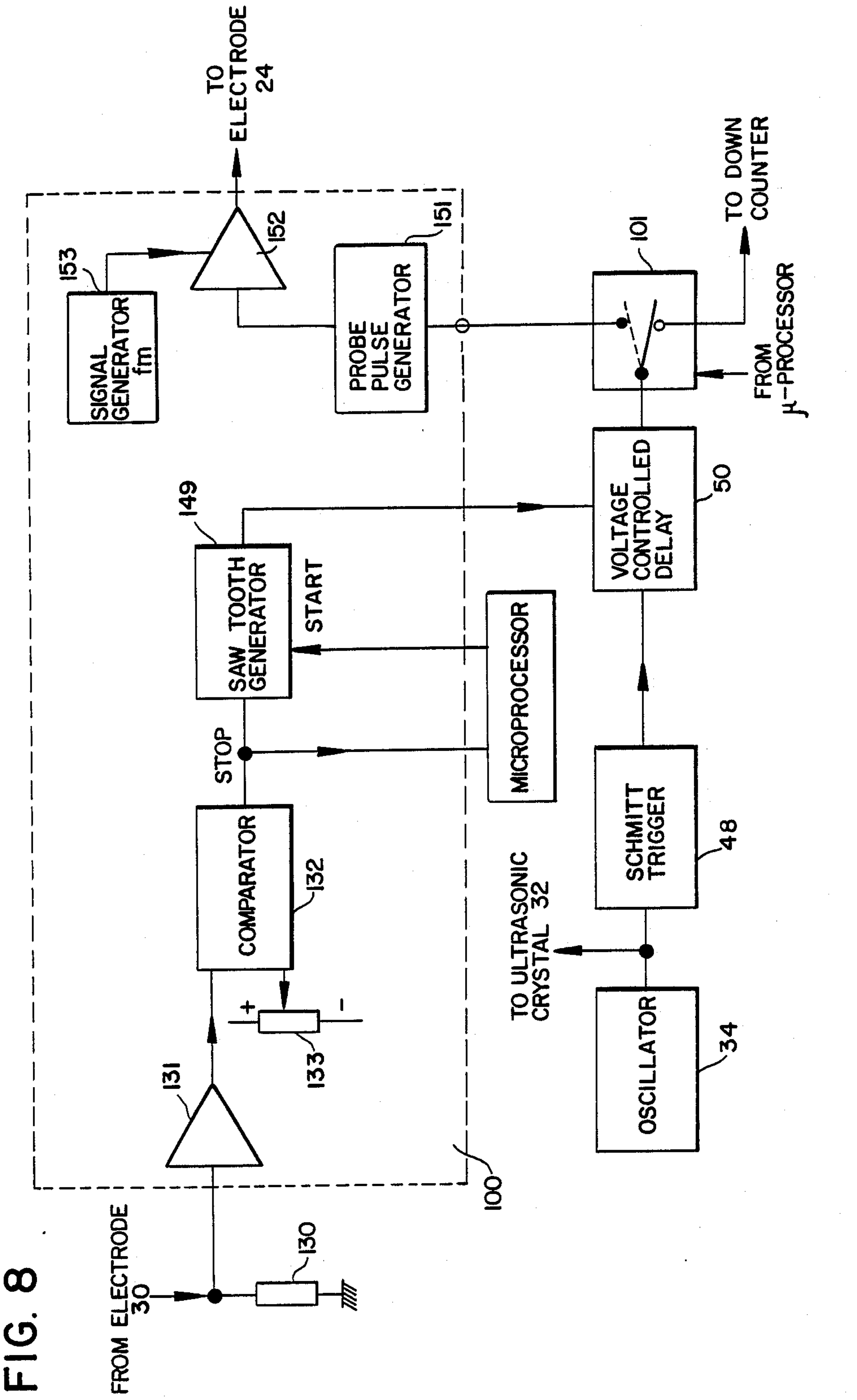
FIG. 8 is a more detailed block diagram of a preferred phase adjustment circuit.

In the above description of the adjustment procedure using the circuit shown in FIG. 8 it has been assumed that this adjustment is carried out immediately before the start of each plotting operation. This is preferred but of course not necessary. Instead the adjustment can be effected during any suitable time of the plotting operation itself, e.g. once during each revolution of the drum 21, e.g. when the record medium free portion of the drum passes the nozzle axis.

The exemplary probe pulse generator circuit 151 shown in FIG. 9 comprises first, second and third monostable flip flops 210, 212, 214, an inverting amplifier 216, a summing differential amplifier 218 and resistors 220, 222, 224.

The input of the first monostable 210 receive the trigger input signal from the voltage control delay circuit 50 when the switch 101 is in the adjustment state. The output of the first monostable 210 is coupled to the input of the second monostable 212, and to the inverting input of amplifier 218 through resistor 222. The output of the second monostable 212 is coupled to the input of the third monostable 214, the output of which is coupled through the inverting amplifier 216 and the resistor 220 to the inverting input of the amplifier 218. The non-inverting input of the amplifier 218 is connected to ground and the output of the amplifier 218 is coupled to the input of the amplifier 152 (FIG. 8) and to the inverting input through the resistor 224 which provides for negative feedback.

The time or phase relationship between the print pulses and the drop formation process can also be controlled by varying another parameter than the relative timing of the oscillator 34 and DCLK signals. Thus, parameters which affect the timing of the drop formation process relative to the excitation signal applied to the ultrasonic transducer 32 may be controlled by the output signal of the saw-tooth generator 149, these parameters include e.g the amplitude of the excitation signal, and the pressure of the ink supplied to the nozzle 12. The amplitude of the excitation signal may be varied by an electronically controlled voltage divider (now shown) in the line from oscillator 34 to the transducer. The ink pressure may be varied by varying an desired pressure signal in a pressure regulating circuit as it is usually employed with the pump which supplies the pressurized ink to the nozzle.

While specific embodiments have been described with reference to the drawings, it should be obvious to those skilled in the art that various changes and modifications are within the scope of the appended claims.

We claim:

1. A method of controlling the relative timing of electrical pulses and a drop formation process in an ink jet printing process, in which an ink jet is directed towards a record medium and disintegrates in the course of a drop formation process at a point of drop formation into a train of individual drops, said drops are selectively charged by applying said electrical pulses between said ink jet and a charging electrode close to said point of drop formation, said drops are subsequently passed through an electrical deflection field to determine, on the basis of the charge which a drop has received whether an individual drop process to said record medium or is intercepted, and relative motion is effected between said ink jet and said record medium, said method comprising applying electrical pulses between said ink jet and said charging electrode with a predetermined phase relationship between the application of said pulses and said drop formation process, varying said phase relationship, measuring an electrical current flowing into said ink jet to supply the electrical charges which are applied to said drops by the application of said electrical pulses, monitoring said current flowing into said ink jet to detect a predetermined current level, and maintaining the time relationship during a subsequent recording process after said current level has occurred.

2. The method of claim 1, wherein the timing of said electrical pulses and of said drop formation process is controlled by a common signal and said varying is effected by varying the time relationship between said common signal and said electrical pulses.

3. The method of claim 1 wherein said relative motion causes said ink jet to aim at that record medium during at least one first interval and at a record medium free location during at least one second interval, and wherein said electrical pulses are applied during said at least one second interval.

4. A method of controlling the relative timing of electrical pulses and a drop formation process in an ink jet printing process, in which an ink jet is directed towards a record medium and disintegrates in the course of a drop formation process at a point of drop formation into a train of individual drops, said drops are selectively charged by applying said electrical pulses between said ink and said point of drop formation, the drops are subsequently passed through an electrical deflection field to determine, on the basis of the charge which a drop has received, whether an individual drop proceeds to said record medium or is intercepted, and relative motion is effected between said ink jet and said record medium, said method comprising applying electrical pulses between said ink jet and said point of drop formation with a predetermined phase relationship between the application of said pulses and said drop formation process.

varying said phase relationship, measuring an electrical current comprised of the electrical charges which are applied to said drops by the application of said electrical pulses, monitoring said current to detect a predetermined current level, maintaining the time relationship during a subsequent recording process after said current level has occurred, wherein the timing of said electrical pulses and of said drop formation process is controlled by a common signal and said varying is effected by varying the time relationship between said common signal and said drop formation process.

5. A method of controlling the relative timing of electrical pulses and a drop formation process in an ink jet printing process, in which an ink jet is directed towards a record medium and disintegrates in the course of a drop formation process at a point of drop formation into a train of individual drops, said drops are selectively charged by applying said electrical pulses between said ink jet and said point of drop formation, the drops are subsequently passed through an electrical deflection field to determine, on the basis of the charge which a drop has received, whether an individual drop proceeds to said record medium or is intercepted, and relative motion is effected between said ink jet and said record medium, said method comprising applying electrical pulses between said ink jet and said point of drop formation with a predetermined phase relationship between the application of said pulses and said drop formation process.

varying said phase relationship, measuring an electrical current comprised of the electrical charges which are applied to said drops by the application of said electrical pulses, monitoring said current to detect a predetermined current level, and maintaining the time relationship during a subsequent recording process after said current level has occurred, said method further including the step of modulating said electrical pulses; said current measuring step comprising the step of detecting said modulation.

6. In an ink jet apparatus which comprises means (21) for supporting a record medium (20), means including a nozzle (12) and an ink conduit (14) for producing at least one ink jet (16) which propagates along a path directed to said supporting means (21) and, and in the course of a drop formation process, disintegrates into a train of drops (18) and a point of drop formation, an electrode system (22) including control electrode means (24) positioned at said point of drop formation, and deflection electrode means (28) extending along said path between said point of drop formation and said supporting means (21), means affecting said drop formation process, said means being responsive to a first control signal, means (34) for generating said first control signal, an ink electrode (30) positioned in said ink conduit, (14), means for producing relative motion between said supporting means (21) and said ink jet, means (40) responsive to said relative motion to produce a position signal (PIXEL) indicating the relative position between said ink jet producing means (12, 14) and said supporting means (21), first means (44, 54) for producing first electrical pulses (PRINT), said means being responsive to a recording control data signal, said position signal and said first control signal, first coupling means (53) for coupling said first electrical pulses to said control electrode means (24), means including delay means (50) for coupling said first electrical pulses across said ink electrode (30) and said control electrode (24), said pulses selectively applying electrical charges to said drops which charges determine the amount of deflection of the drops by said deflection electrode such that the drops are either allowed to proceed to said record medium or are intercepted, a circuit (FIG. 8) for controlling the relative timing of said electrical pulses and said drop formation process, said circuit comprising second means (151) for generating second electrical pulses in response to said first control signal;

means (50, 101) for coupling said first control signal (from oscillator 34) t said second pulse generating means (151)

second coupling means (152) for coupling said second electrical pulses from said second pulse generating means (151) across said ink electrode (30) and said control electrode (24)

means (130, 131) for sensing a current comprised of the electrical charges which are applied to said drops by said second electrical pulses to produce a current signal, means for varying the time relationship between said first and second electrical pulses and said drop formation process in response to a second control signal, means (149) for producing and varying said second control signal and applying said variable second control signal to said time relationship varying means to vary said time relationship, means (132) responsive to said current signal to produce a third control signal (STOP) when said current signal exceeds a predetermined level, means for applying said third control signal to said means for generating and varying said second control signal to maintain said time relationship in the state existing at the time of occurrence of said third control signal.

7. The circuit of claim 6 wherein said means for varying the time relationship comprises said delay means (50), the delay of which be variable in response to said second control signal.

8. The circuit of claim 6 wherein said means for producing and varying said second control signal comprises a saw-tooth generator (149) which is started by a start signal from an external source and is stopped by said third control signal.

9. The circuit of claim 6 wherein said means (132) responsive to said current signal comprises a comparator having a first input coupled to receive said current signal and a second input coupled to receive a reference signal.

10. The circuit of claim 6 wherein said second pulse generating means comprises a circuit (210, 212, 214, 216, 218, 220, 222, 224) to produce pulses (FIG. 6) which comprise a positive going portion and a negative going portion.

11. The circuit of claim 10 wherein said positive and negative portions are spaced.

12. The circuit of claim 6 wherein said means for coupling said first electrical pulses and said means for coupling said second electrical pulses comprise switch means (101) for selectively coupling said first control signal to said first and second pulse generating means.

* * * * *